United States Patent
Lerner et al.

(10) Patent No.: US 8,129,060 B2
(45) Date of Patent: Mar. 6, 2012

(54) BLEED TRIGGER MONITOR USED IN FUEL CELL SYSTEM

(75) Inventors: Seth E. Lerner, Honeoye Falls, NY (US); Darrell W. Burleigh, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 575 days.

(21) Appl. No.: 12/358,969

(22) Filed: Jan. 23, 2009

(65) Prior Publication Data

US 2010/0190073 A1    Jul. 29, 2010

(51) Int. Cl.
*H01M 8/04* (2006.01)
(52) U.S. Cl. .................. 429/429; 429/443
(58) Field of Classification Search ......... 429/110, 429/429, 443, 444
See application file for complete search history.

(56) References Cited

U.S. PATENT DOCUMENTS

2008/0182142 A1*  7/2008  Gade et al. ............ 429/23

* cited by examiner

*Primary Examiner* — Thanhha Pham
(74) *Attorney, Agent, or Firm* — John A. Miller; Miller IP Group, PLC (57) ABSTRACT

A system and method for monitoring anode bleed trigger events and determining when to adjust a proactive bleed schedule in a fuel cell system. The system employs a bleed trigger monitor algorithm for monitoring proactive bleed and reactive bleeds that determines whether the reactive bleeds are caused by excess nitrogen in the anode. The algorithm monitors the number of reactive bleeds that are cause by nitrogen accumulation in the anode side of the fuel cell stack and changes the proactive bleed schedule in response thereto, if necessary.

18 Claims, 5 Drawing Sheets

BLEED TRIGGER MONITOR USED IN FUEL CELL SYSTEM

BACKGROUND OF THE INVENTION

1. Field of the Invention

This invention relates generally to a system and method for monitoring the anode bleed process of a fuel cell system and, more particularly, to a system and method for monitoring proactive and reactive bleeds of a fuel cell system that includes determining when the proactive bleed schedule should change to optimize the operation of the fuel cell system based on the number of reactive bleeds that have occurred as a result of an unexpected increase of nitrogen build-up in the anode-side of the fuel cell stack usually as a result of an aging system.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange member fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between the two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The MEAs are permeable and thus allow nitrogen in the air from the cathode side of the stack to permeate therethrough and collect in the anode side of the stack, referred to in the industry as nitrogen cross-over. Even though the anode side pressure may be higher than the cathode side pressure, the cathode side partial pressures will cause air to permeate through the membrane. Nitrogen in the anode side of the fuel cell stack dilutes the hydrogen such that if the nitrogen concentration increases beyond a certain percentage, such as 50%, the fuel cell stack becomes unstable and may fail. It is known in the art to provide a bleed valve at the anode exhaust gas output of the fuel cell stack to remove nitrogen from the anode side of the stack.

Some fuel cell systems employ anode flow shifting where the fuel cell stack is split into sub-stacks and the anode reactant gas is flowed through the split sub-stacks in alternating directions. In these types of designs, a bleed manifold unit (BMU) is sometimes provided between the split sub-stacks that includes the valves for providing the anode exhaust gas bleed.

An algorithm may be employed to provide an online estimation of the nitrogen concentration in the anode exhaust gas during stack operation to determine when to trigger the anode exhaust gas bleed. The algorithm may track the nitrogen concentration over time in the anode side of the stack based on the permeation rate from the cathode side to the anode side, and the periodic bleeds of the anode exhaust gas. When the algorithm calculates an increase in the nitrogen concentration above a predetermined threshold, for example 10%, it may trigger the bleed. This bleed, sometimes referred to as a proactive bleed, is typically performed for a duration that allows multiple stack anode volumes to be bled, thus reducing the nitrogen concentration below the threshold.

Another type of known bleed is referred to as a reactive bleed. In a reactive bleed an algorithm calculates the cell voltage and triggers a bleed when a cell voltage stack spread threshold or bounce threshold is exceeded. Stack spread is the difference between the maximum and minimum cell voltage per split sub-stack. Stack bounce is the absolute difference between the average cell voltage of both sub-stacks. The primary cause of cell voltage loss is nitrogen buildup in the stack. Thus, the typical purpose of the reactive bleed is to bleed the nitrogen accumulated in the anode side of the stack to improve the minimum cell voltage and reduce the stack voltage spread of the split stack system. Other less common causes of reactive bleed are known, such as drying out of the membrane or excess water in the anode.

As is well understood in the art, fuel cell membranes operate with a controlled relative humidity (RH) so that the ionic resistance across the membrane is low enough to effectively conduct protons. The fuel cell system is able to determine whether the membrane is too dry or too wet using a sensor that determines the high frequency resistance of the fuel cell. High frequency resistance (HFR) is the ohmic resistance of the membrane, which changes with hydration of the membrane. The higher the HFR the drier the stack, and the lower the HFR the more likely that excessive water in the anode is the cause of the reactive bleed.

One known anode exhaust gas bleed control algorithm determines the duration of the bleed based on a fixed time that would eliminate the desired amount of nitrogen. However, as a fuel cell stack ages, cell performance decreases and nitrogen bleeds are required more often. Therefore, those systems that employ a fixed bleed duration typically select a bleed duration for the mid-life of the stack as a suitable average for the entire stack life. However, such an anode bleed strategy is obviously not efficient for the whole life of stack where the bleed duration typically would be too long and too frequent when the stack is new and too short and too infrequent when the stack is near the end of its life. When the bleed is too long, the system operates inefficiently because a significant amount of hydrogen is being exhausted out of the anode exhaust. When the bleed is too short, the fuel cells begin to collapse, which triggers an anode bleed that normally may not be necessary. Typically the bleed duration is determined for different current density ranges of the stack, but which are fixed values through the life of the stack. Because the bleed trigger table is static, the calibration is biased in favor of cell stability to account for cell degradation. Thus, hydrogen is sacrificed using a fixed table in an effort to maintain cell stability over the duration of the stack life.

SUMMARY OF THE INVENTION

In accordance with the teachings of the present invention, a system and method are disclosed for monitoring anode bleed trigger events and determining when to adjust a proactive bleed schedule in a fuel cell system. The system employs a bleed trigger monitor algorithm for monitoring proactive bleed and reactive bleeds that determines whether the reactive bleeds are caused by excess nitrogen in the anode. The algorithm monitors the number of reactive bleeds that are cause by nitrogen accumulation in the anode side of the fuel cell stack and changes the proactive bleed schedule in response thereto, if necessary.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for monitoring the bleed events for bleeding the anode side of a fuel cell stack in a fuel cell system is merely exemplary in nature, and is in no way intended to limit the invention or its applications or uses.

Figure 1:
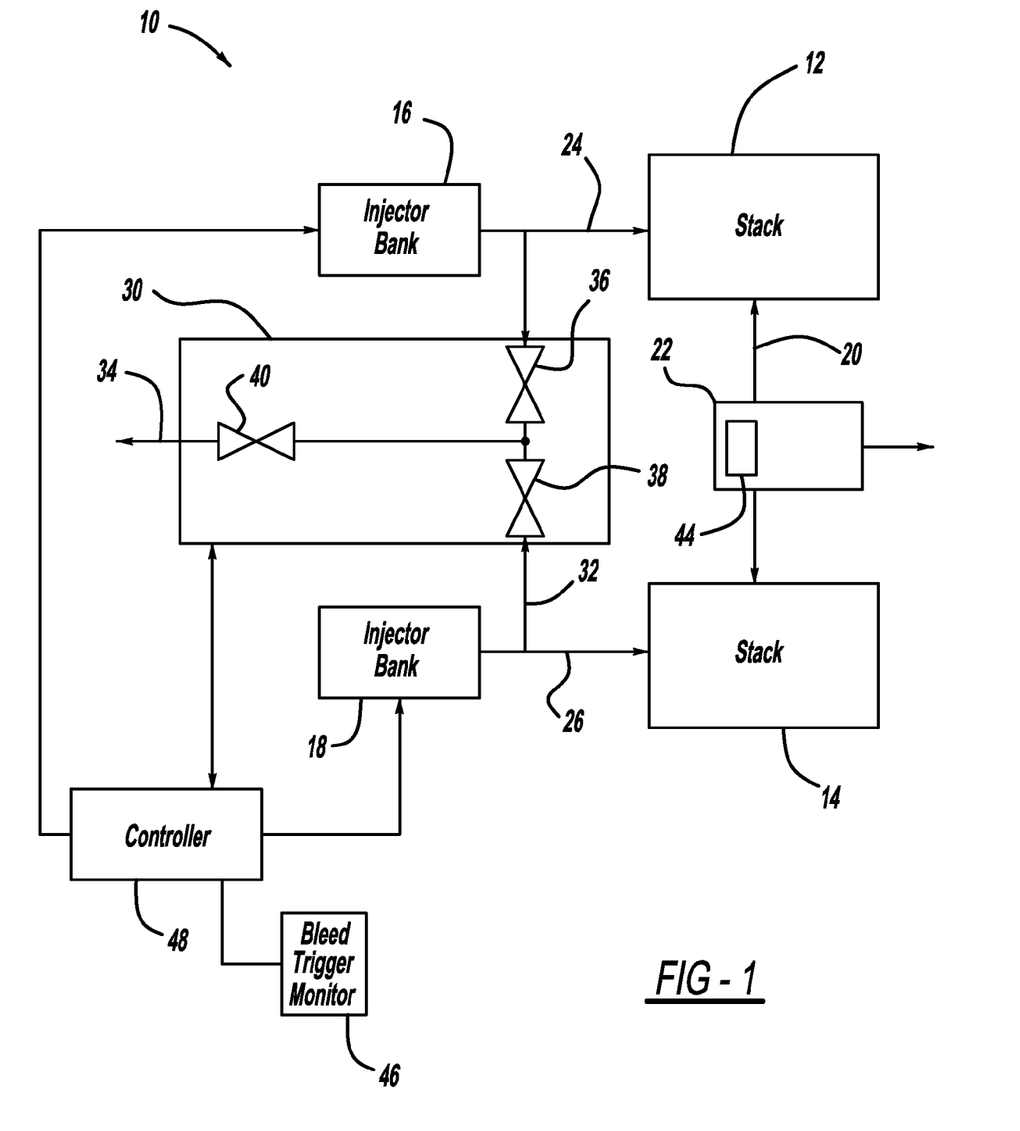
FIG. 1 is a schematic block diagram of a fuel cell system.

FIG. 1 is a schematic block diagram of a fuel cell system 10 including split fuel cell sub-stacks 12 and 14 that operate under anode flow shifting. When the flow is in one direction, an injector bank 16 injects fresh hydrogen into the anode side of the sub-stack 12 on anode input line 24. Anode gas that is output from the sub-stack 12 is sent to the sub-stack 14 on connecting line 20. When the flow is in the opposite direction, an injector bank 18 injects fresh hydrogen into the anode side of the sub-stack 14 on anode input line 26 that is output from the sub-stack 14 and sent to the sub-stack 12 on the line 20. A drain valve 22 is provided in the line 20 and can be used for a center bleed. A high frequency resistance sensor 44 measures the ohmic resistance of the membranes and is housed with the drain valve 22.

A BMU 30 is provided at an anode input to the split sub-stacks 12 and 14 and provides an anode exhaust gas bleed during certain times to remove nitrogen from the anode side of the sub-stacks 12 and 14 based on any suitable bleed schedule. The BMU 30 includes a line 32 that connects the anode input lines 24 and 26 and an exhaust line 34 that connects the line 32 to the exhaust of the system 10, typically the cathode side exhaust of the sub-stacks 12 and 14. A first bleed valve 36 is provided in the line 32 proximate the sub-stack 14. An exhaust valve 40 is provided in the line 34 that is opened during the anode bleed and other times as may be required. A controller 48 controls the injector banks 16 and 18 and the valves 36, 38 and 40, and monitors the high frequency resistance sensor 44 and a bleed trigger monitor 46 discussed below.

When the system 10 is operating under anode flow-shifting and no bleed is commanded, the bleed valves 36 and 38 are both closed, so that depending on the direction of the anode gas flow, the output of the second sub-stack is dead-ended. If a bleed is commanded, and the flow-shifting is in the direction from the sub-stack 12 to the sub-stack 14 through the line 20, then the bleed valve 38 is opened and the bleed valve 36 is closed. Likewise, if a bleed is commanded and the flow is in the direction from the sub-stack 14 to the sub-stack 12 through the line 20, then the first bleed valve 36 is opened and the second bleed valve 38 is closed. Thus, the anode exhaust gas is bled out of the exhaust line 34 through the exhaust valve 40.

The present invention discloses a bleed monitoring algorithm for controlling the bleed events for the sub-stack 12 and 14. Proactive bleeds indicate the system 10 may be functioning properly, and reactive bleeds indicate the system 10 may be experiencing cell instability and may be attempting to recover from low cell voltage before a quick stop is necessary to protect the system. Therefore, the bleed trigger monitoring algorithm is employed to determine how many reactive bleeds are occurring and at what rate, and which reactive bleeds are due to nitrogen-based starvation and which reactive bleeds are caused by something else, such as excess water in the anode or drying of the membrane. If the bleed monitoring algorithm determines that the reactive bleeds are nitrogen-based too often, the system may change the proactive trigger to reduce the number of reactive bleeds necessary to protect the system by increasing the frequency and/or duration of the proactive bleeds. Alternatively, other system changes could be made to optimize system efficiency and stability. The monitoring system could also monitor other inputs, such as drain events, cell voltages, location of a weak cell, or high frequency resistance concomitantly with reactive bleed triggers to determine when to make changes to base table calibrations of the fuel cell system.

By monitoring the bleed triggers, particularly the reactive bleed triggers, the fuel cell system 10 is able to determine whether those reactive bleeds are successful or not and what caused the reactive bleed triggers. The fuel cell system 10 can evaluate that information and adjust the proactive bleed schedule as necessary to optimize the bleed efficiency and cell stability over the life of the sub-stack 12 and 14. This will result in the loss of less hydrogen, increased end of life cell performance and stability, and account for system or hardware variations. Additional benefits include the diagnostic information the monitor provides, such as premature hardware degradation or excessive cell flooding or drying out of the membrane.

Figure 2:
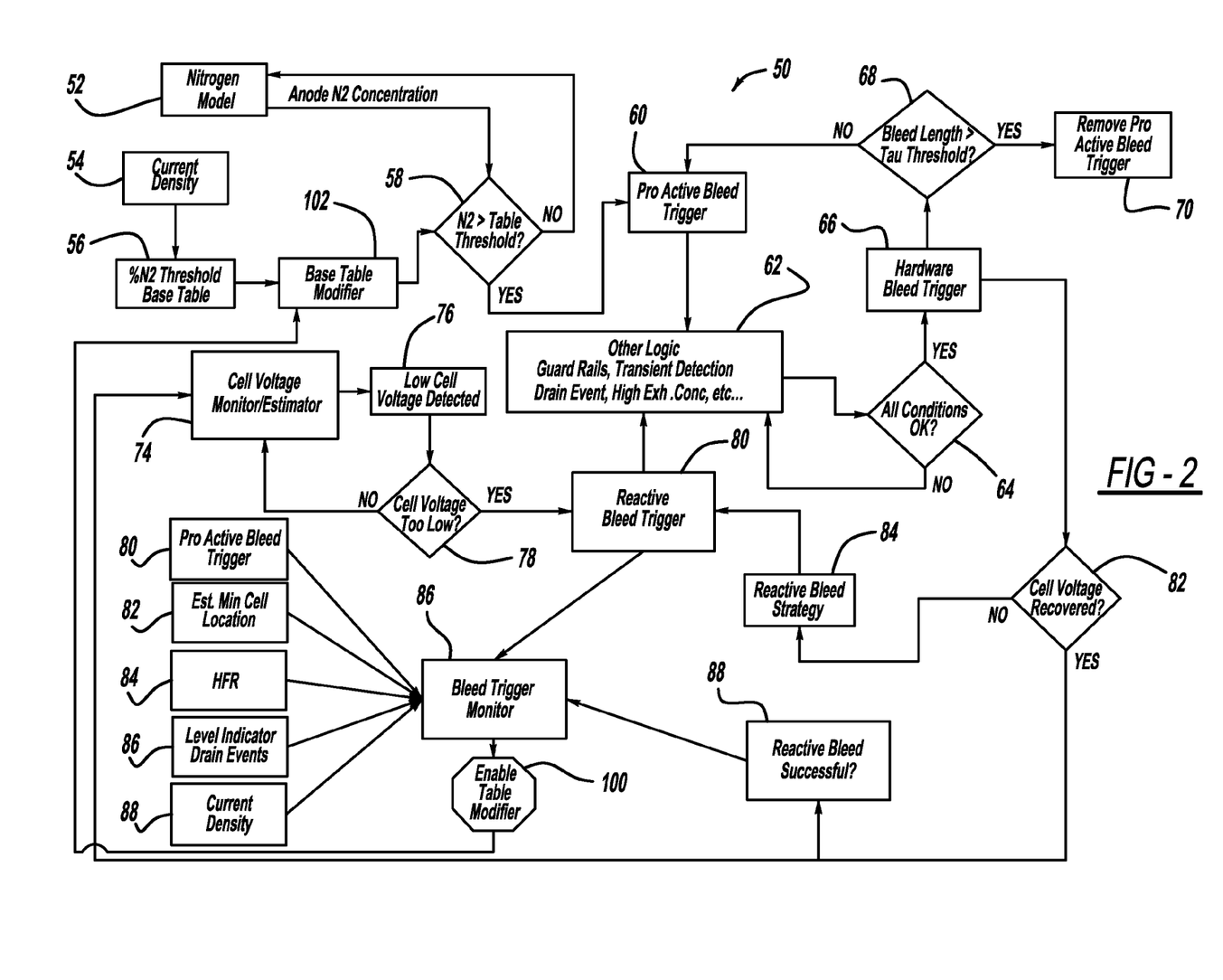
FIG. 2 is a flow chart diagram showing a process for a bleed trigger monitoring system.

FIG. 2 is a flow chart diagram 50 showing a process for a proactive and reactive bleed trigger algorithm that operates in the bleed trigger monitor 46 in the manner discussed above. A nitrogen model at box 52 determines the nitrogen concentration in the anode side of the sub-stacks 12 and 14. Alternatively, an anode hydrogen concentration model could be used, as is known to those skilled in the art. The algorithm monitors the nitrogen concentration in the anode, and determines when the percentage of nitrogen exceeds a predetermined threshold at decision diamond 58. The threshold at the decision diamond 58 is set by a base table modifier 102. The base table modifier 102 is changed in response to excessive reactive anode bleeds by a table modifier box 100, as will be discussed more in detail below. The threshold changes for different stack current densities at box 54 as applied to a percent nitrogen threshold base table box 56. Therefore, if the threshold causes a proactive bleed schedule to occur at a certain interval for a certain stack current density based on the nitrogen model, and that interval results in reactive bleeds occurring too often because of nitrogen accumulation, then the algorithm recognizes that the proactive bleed schedule is not satisfactory, and adjusts the threshold accordingly. Different system parameters may be responsible for the change in nitrogen accumulation in the sub-stacks 12 and 14. Thus, as the sub-stacks 12 and 14 age, the proactive bleed schedule is adjusted for the changes in stack parameters.

If the percentage of nitrogen exceeds the threshold at the decision diamond 58, a proactive bleed trigger is initiated at box 60. Once the proactive bleed trigger is initiated, the algorithm must ensure that the parameters of various logic are properly oriented at box 62 so the system 10 can properly open the bleed valve 36 or 38 requested by the proactive bleed trigger. Examples of suitable logic include, but are not limited to, guard rails, transient detection, drain event, and high hydrogen concentration in the exhaust. Similar logic will be readily apparent to one skilled in the art. If the logic is properly oriented, the algorithm determines whether all of the conditions are okay at decision diamond 64 and, if so, the bleed valve 36 or 38 is opened at a hardware bleed trigger box 66. If the logic is not properly oriented at the decision diamond 64, the algorithm must wait for the logic to be properly orientated at the box 62 to determine when all of the conditions are okay and the bleed valve 36 or 38 can be opened.

A decision diamond 68 determines if the bleed duration length has been met and, if so, the bleed is stopped at box 70. Upon removing the proactive bleed trigger at the box 70, the nitrogen model at box 52 is reset to zero, or some other baseline value, and the algorithm again monitors the anode nitrogen concentration. If the algorithm determines the bleed length has not been met at the decision diamond 68, the proactive bleed trigger at the box 60 remains open.

The high level bleed trigger algorithm also provides for reactive bleeds. The algorithm monitors cell voltage using a monitor/estimator at box 74. If a low cell voltage is detected at box 76, a decision diamond 78 determines whether the cell voltage is too low, thus requiring remedial action. If the cell voltage is too low, a reactive bleed trigger is requested at box 80. Before the bleed valve 36 or 38 can be opened, the algorithm must first determine whether the system logic is properly oriented at the box 62 so that it will allow the bleed valve 36 or 38 to open at the time of request. If the algorithm determines that the logic is properly oriented and all conditions are okay at the decision diamond 64, the hardware bleed triggers at the box 66 allows the bleed valve 36 or 38 to open and the reactive bleed to occur. If the algorithm determines that the logic is not properly oriented, the algorithm must wait for the logic at the box 62 to determine when all conditions are okay and the bleed valve may open.

Decision diamond 82 determines whether the cell voltage has recovered. If the cell voltage has recovered, the algorithm resumes monitoring cell voltage using the cell voltage monitor/estimator at the box 74. If the cell voltage has not recovered, a second reactive bleed strategy is utilized at box 84. In certain systems, a second level bleed strategy may not be present and instead the system will simply repeat the reactive bleed trigger at the box 80 or enter a rapid shut-down.

The bleeds are monitored by a bleed trigger monitor at the box 86. The bleed trigger monitor tracks the number of proactive bleeds and reactive bleeds, and whether the reactive bleeds are successful at box 88. The bleed trigger monitor at the box 86 also monitors various system inputs and information at boxes 90-98. Some of the information the bleed trigger monitor may track includes proactive bleeds at box 90, the estimated location of the cell experiencing minimum cell voltage at box 92, high frequency resistance (HFR) at box 94, level indicator drain events at box 96 and stack current density at box 98. These inputs, either independently or in combination, indicate whether the bleed event was caused by the accumulation of nitrogen in the anode or due to some other cause, such as water buildup in the anode or excessive drying of the membrane. Based on these inputs, the bleed trigger monitor at the box 86 determines whether a table modifier at the box 100 shall be enabled. The bleed trigger monitor at the box 86 enables the table monitor at the box 100 if the inputs it receives from the boxes 90-98 indicates that the current proactive bleed schedule is not suitable to remove nitrogen quickly enough from the sub stacks 12 and 14 to maintain a desirable stack stability. Therefore, by mentoring the various parameters of the system, the proactive bleed schedule can be adjusted, and the reactive bleed can be reduced so that the system operates in a more optimized manner. Thus, a base table modifier at the box 102 will be changed and a new nitrogen threshold at the decision diamond 58 will be established for a better system operation.

Figure 3:
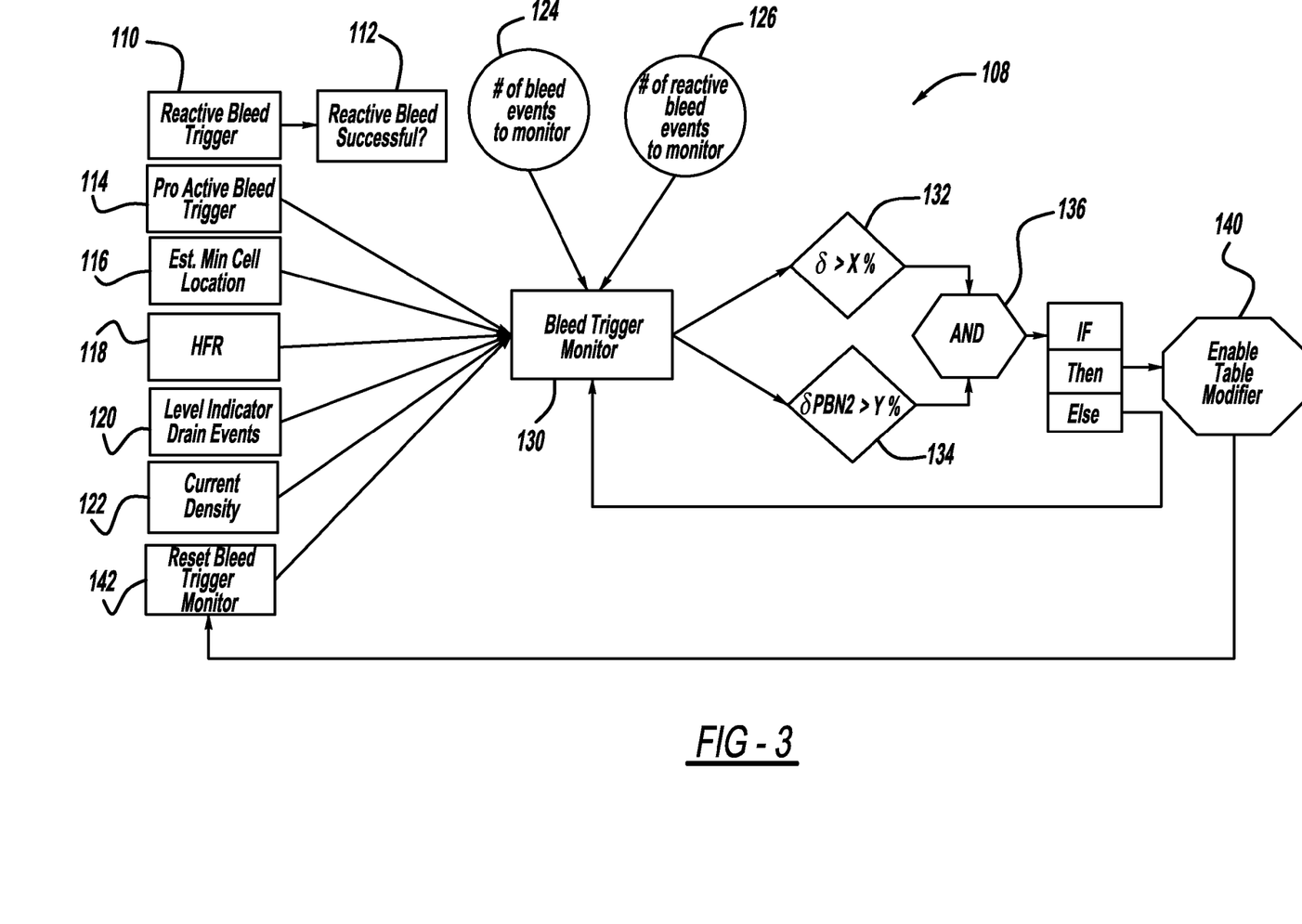
FIG. 3 is a flow chart of the bleed trigger monitor system in greater detail.

FIG. 3 is a flow chart diagram 108 showing a more detailed operation the operation of the bleed trigger monitor system. Inputs of the bleed trigger monitor include a reactive bleed trigger at box 110, whether the reactive bleed was successful at box 112, a proactive bleed trigger at box 114, an estimation of the location of the cell with minimum voltage at box 116, HFR at box 118, level indicator and drain events at box 120, and stack current density at box 122. Other inputs include the number of bleed events at circle 124 and the number of reactive bleed events at circle 126. When a bleed trigger monitor at box 130 determines whether a table modifier at box 140 is enabled, the bleed trigger monitor 130 performs logic operations. For example, when monitoring all of the reactive bleeds, if the bleed trigger monitor logic determines the high frequency resistance at the box 118 is greater than a value X during a reactive bleed at decision diamond 132, and the location of the cell with minimum voltage at the box 116 is greater than a value Y cell number at decision diamond 134, and if the reactive bleed recovers the cell stability before a hard time limit T at box 136, then the reactive bleed is determined to be nitrogen based and monitored as such by the bleed trigger monitor at the box 130.

Essentially, the bleed trigger monitor at the box 130 keeps track of ratios, such as:

$$\delta = \frac{RB_{N2}}{(PB + RB_{N2})}$$

$$\delta_{RB_{N2}} = \frac{RB_{N2}}{RB_{Total}}$$

Where PB is the number of proactive bleeds, $RB_{Total}$ is the total number of reactive bleeds, and $RB_{N2}$ is the number of nitrogen reactive bleeds.

If these ratios go above predetermined thresholds at the decision diamonds 132 or 134, then the bleed trigger monitor at the box 132 will either continue to monitor the ratios or enable the table modifier at the box 140. Once the table modifier is enabled, the bleed trigger monitor 130 is reset at box 142. Thus, the monitor starts counting bleed events from zero after a change in the frequency of the proactive bleeds is implemented.

Figure 4:
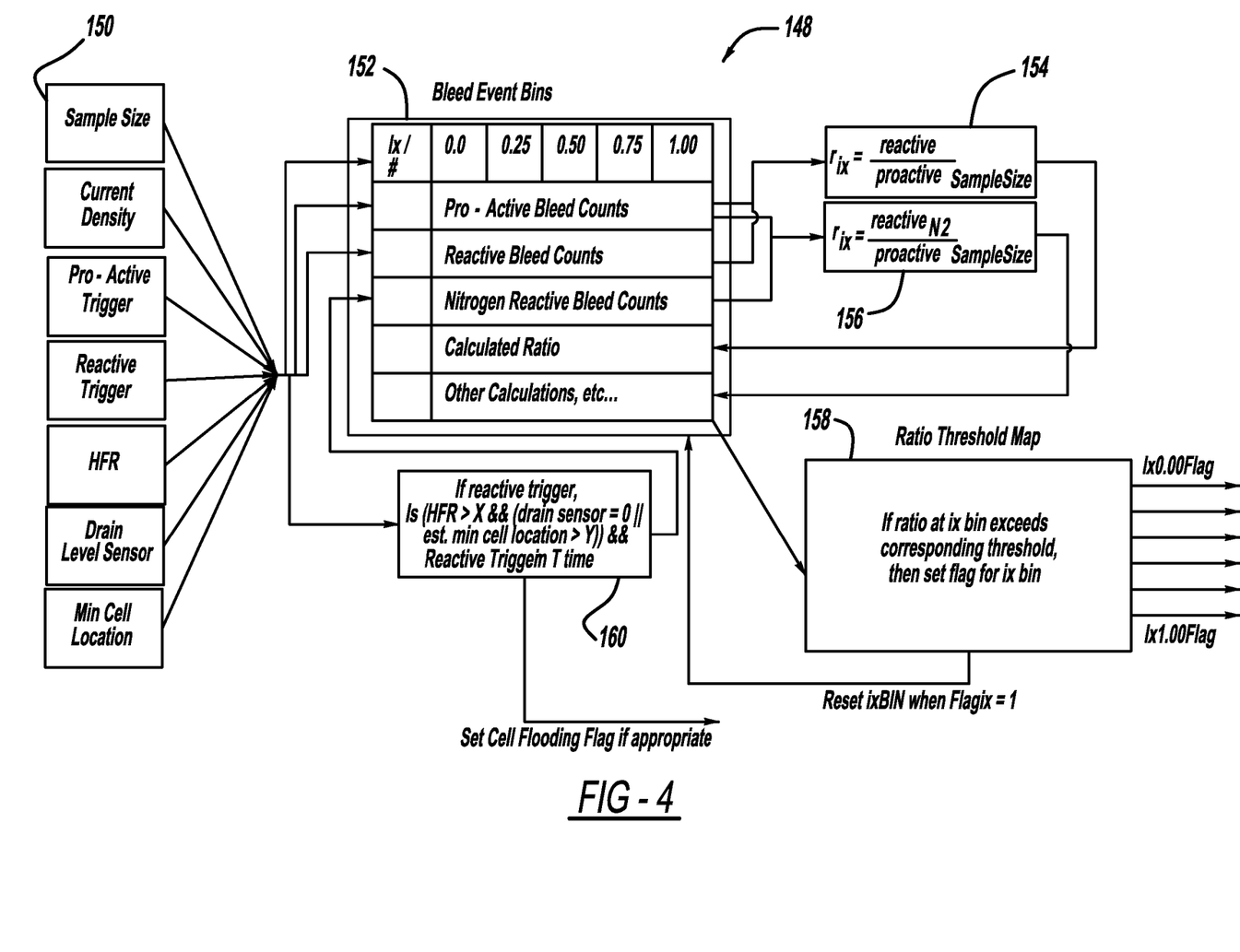
FIG. 4 is a flow chart showing calculations for the bleed trigger monitor system of FIG. 2 and FIG. 3.

FIG. 4 is a flow chart diagram 148 showing more detail of the calculations of the bleed trigger monitor system described above. Input boxes 150 provide the inputs discussed above that are stored in bleed event bins at box 152, which is a table in RAM while the controller 48 is operating. Upon controller shut-down, the table is written into NVM locations for retrieval at the next system operation. A ratio of reactive bleeds over proactive bleeds is calculated for a sample size at box 154, and a ratio of nitrogen based reactive bleeds over proactive bleeds is calculated at box 156. Both calculations are stored in the bleed event bins at the box 152. If either of these ratios exceeds a corresponding threshold, a flag is set at box 158 and a decision is made as to whether or not operating parameters need to be changed. Additionally, if a reactive trigger occurs, the algorithm determines if the HFR is greater than X during the reactive bleed and if the cell with the minimum cell voltage is lower than Y cell number, but greater than Z cell number, and if the reactive bleed recovers stability before hard time limit T at box 160, then the reactive bleed is nitrogen based and stored as such in the bleed events bin at box 152.

Figure 5:
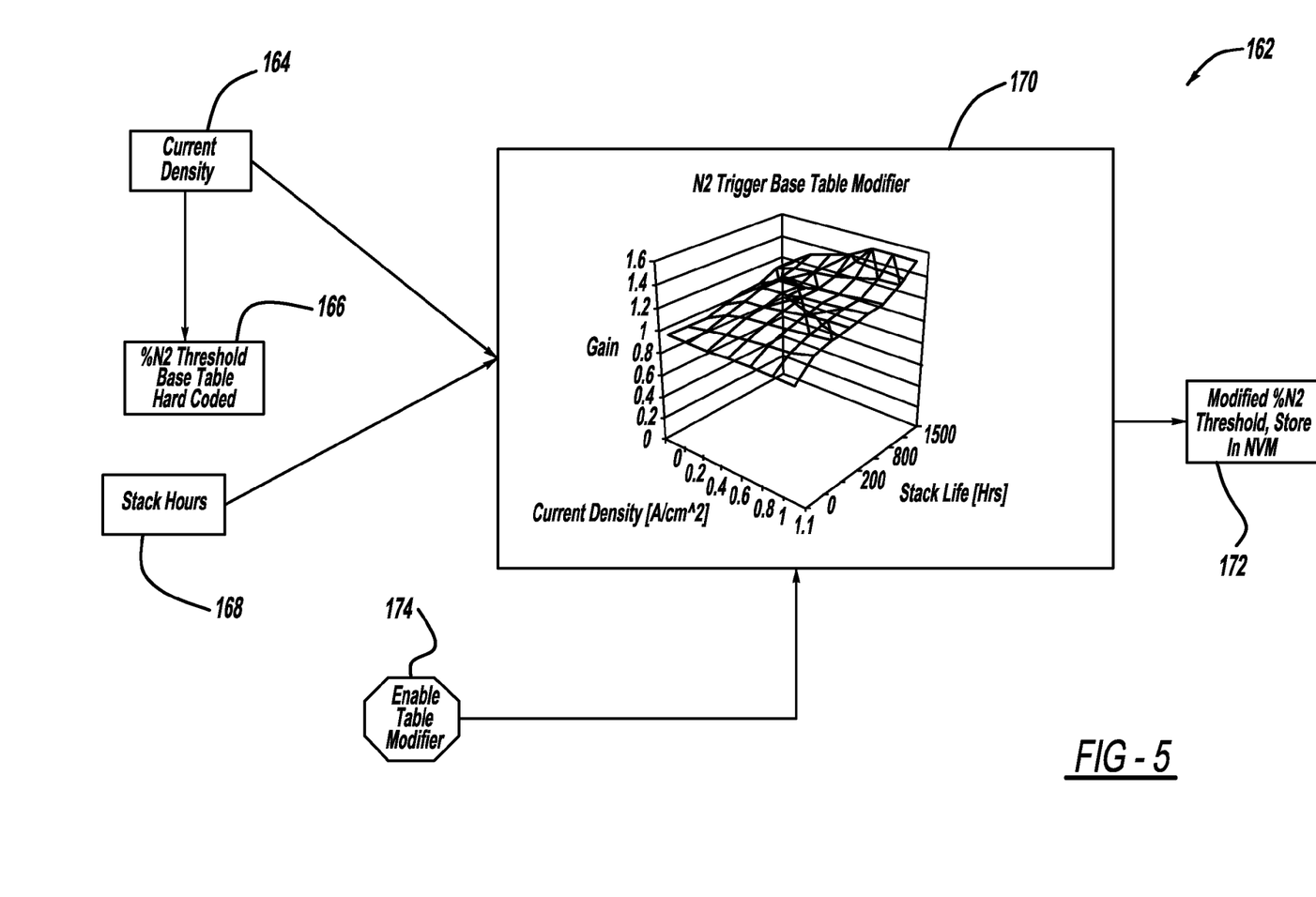
FIG. 5 is a flow chart of an open loop base table modifier function.

FIG. 5 is a flow chart diagram 162 of an open loop based table modifier function where a look-up table is utilized to adjust the nitrogen trigger based on current density and stack life. Thus, when a table modifier is enabled at box 174, the controller 48 will determine the current density of the fuel cell stack at box 164 and compare it to the nitrogen threshold based table at box 166. The controller 48 will also determine the stack hours at box 168 of the fuel cell system. This information is fed into an open loop base table modifier at box 170, where it becomes a gain. The modified percent of anode nitrogen, which is to be a new threshold, is determined based on this gain. Thus, this new threshold at box 172 is fed into the base table modifier box 104 of the flow diagram 50. This changes the proactive bleed trigger as needed to ensure the fuel cell system runs efficiently. In this way, the amount of hydrogen wasted is reduced because the system is able to adapt to changing conditions instead of being forced to proactively bleed at some conservative fixed rate.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining bleed events for a fuel cell stack in a fuel cell system, said method comprising:
    predicting the accumulation of nitrogen in an anode side of the fuel cell stack for a proactive bleed;
    triggering a proactive bleed if the accumulation of nitrogen in the anode side of the fuel cell stack exceeds a proactive bleed threshold;
    triggering a reactive bleed of the fuel cell stack in response to predetermined system conditions;
    determining whether the predetermined system conditions are a result of excessive accumulation of nitrogen in the anode side of the fuel cell stack;
    determining the rate of reactive bleeds as a result of excessive nitrogen accumulation in the anode side of the fuel cell stack; and
    changing the proactive bleed threshold for the proactive bleed if the rate of reactive bleeds caused by nitrogen accumulation exceeds a reactive bleed threshold.

2. The method according to claim 1 wherein predicting the accumulation of nitrogen in the anode side of the fuel cell stack for the proactive bleed includes using a nitrogen model.

3. The method according to claim 1 wherein the proactive bleed threshold changes for different stack current densities.

4. The method according to claim 1 wherein determining whether the predetermined system conditions are the result of the accumulation of nitrogen in the anode side of the fuel cell stack includes using a bleed trigger monitor algorithm that receives a plurality of system inputs.

5. The method according to claim 4 wherein the system inputs include a cell high frequency resistance, an estimated location of a weak fuel cell, level indicator of drain events, stack current density, proactive bleed trigger events, number of bleed events and number of successful bleed events.

6. The method according to claim 1 wherein changing the proactive bleed threshold includes changing the proactive bleed threshold using a cell high frequency resistance value, a location of a cell with minimum voltage in the fuel cell stack and a predetermined time limit.

7. The method according to claim 6 wherein changing the proactive bleed threshold includes changing the proactive bleed threshold if the cell high frequency resistance value of a cell in the fuel cell stack is greater than a predetermined high frequency resistance value and the location of a fuel cell with a minimum voltage is greater than a predetermined minimum cell voltage during same time limit.

8. The method according to claim 1 wherein triggering a reactive bleed of the fuel cell stack in response to predetermined system conditions also includes determining that the reactive bleed of the fuel cell stack is not because of the accumulation of nitrogen in the anode side of the fuel cell stack.

9. A method for determining bleed events for a fuel cell stack in a fuel cell system, said method comprising:
    predicting the accumulation of nitrogen in an anode side of the fuel cell stack for a proactive bleed using a nitrogen model;
    triggering the proactive bleed if the accumulation of nitrogen in the anode side of the fuel cell stack exceeds a proactive bleed threshold;
    triggering a reactive bleed of the fuel cell stack in response to predetermined system conditions that indicate excessive nitrogen has accumulated in the anode side of the fuel cell stack; and
    changing the proactive bleed threshold for the proactive bleed if a rate of reactive bleeds caused by nitrogen accumulation in the anode side of the fuel cell stack exceeds a reactive bleed threshold, wherein the reactive bleed threshold is determined by cell high frequency resistance and minimum cell voltage during a predetermined time limit.

10. The method according to claim 9 wherein the proactive bleed threshold changes for different stack current density.

11. The method according to claim 9 wherein triggering a reactive bleed of the fuel cell stack in response to predetermined system conditions includes using a bleed trigger monitor algorithm that receives a plurality of system inputs.

12. The method according to claim 11 wherein the system inputs include a cell high frequency resistance, an estimated location of a weak fuel cell, level indicator of drain events, stack current density, proactive bleed trigger events, number of bleed events and number of successful bleed events.

13. The method according to claim 9 wherein changing the proactive bleed threshold includes changing the proactive bleed threshold if the cell high frequency resistance value of a cell in the fuel cell stack is greater than a predetermined high frequency resistance value and the location of a fuel cell with a minimum voltage is greater than a predetermined minimum cell voltage during the same time sample.

14. A fuel cell system comprising:
a fuel cell stack including an anode side;
a bleed valve for bleeding an anode exhaust from the anode side of the fuel cell stack; and
a controller operating a bleed monitoring algorithm for controlling the bleed valve for bleeding the anode side of the fuel cell stack, said bleed monitoring algorithm predicting the accumulation of nitrogen in the anode side of the fuel cell stack for a proactive bleed, triggering the proactive bleed if the accumulation of nitrogen in the anode side of the fuel stack exceeds a proactive bleed threshold, triggering a reactive bleed of the fuel cell stack in response to predetermined system conditions, determining whether the predetermined system conditions are a result of excessive accumulation of nitrogen in the anode side of the fuel cell stack, determining the rate of reactive bleeds as a result of excessive nitrogen accumulation in the anode side of the fuel cell stack, and changing the proactive bleed threshold for the proactive bleed if the rate of reactive bleeds caused by the nitrogen accumulation exceeds a reactive bleed threshold.

15. The system according to claim 14 wherein the controller monitors the accumulation of nitrogen in the anode side of the fuel cell stack for the proactive bleed using a nitrogen model.

16. The system according to claim 14 wherein the controller changes the proactive bleed threshold for different stack current densities.

17. The system according to claim 14 wherein the controller uses a bleed trigger monitor algorithm that receives a plurality of system inputs including cell high frequency resistance, estimated location of a week fuel cell, stack current density, proactive bleed trigger events, number of bleed events and number of successful bleed events to determine whether the predetermined system conditions are the result of the accumulation of nitrogen in the anode side of the fuel cell stack.

18. The system according to claim 14 wherein the controller changes the proactive bleed threshold in response to a cell high frequency resistance value at a location of a minimum cell voltage during a predetermined time limit.

* * * * *